No. 741,055. PATENTED OCT. 13, 1903.
J. MILLER.
FILTERING APPARATUS.
APPLICATION FILED NOV. 24, 1902.
NO MODEL.
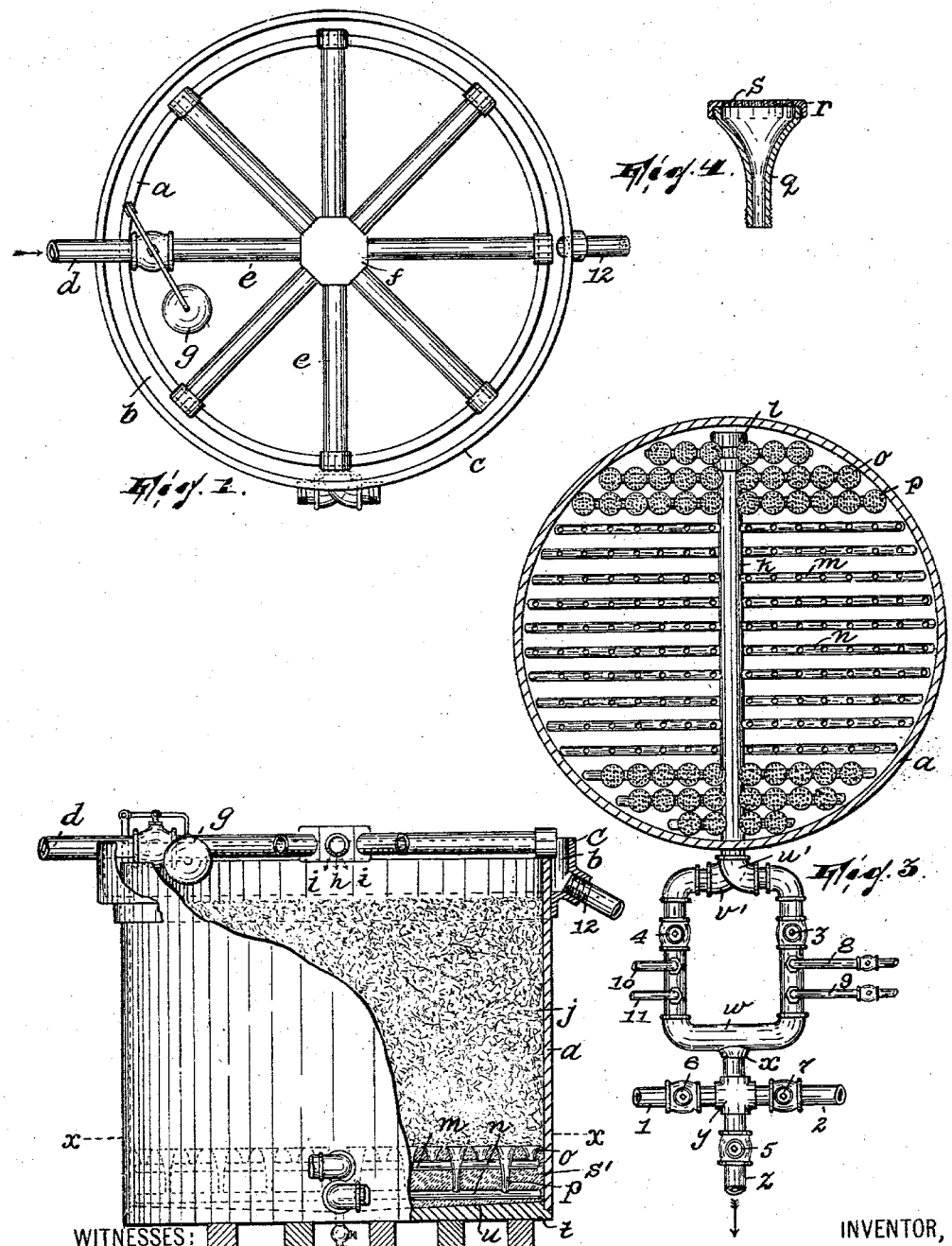
INVENTOR,
Joseph Miller,
BY
Arthur F. Seward,
ATTORNEYS
WITNESSES:

No. 741,055.

Patented October 13, 1903.

UNITED STATES PATENT OFFICE.

JOSEPH MILLER, OF NEW YORK, N. Y., ASSIGNOR OF TWO-THIRDS TO ISAAC L. MILLER, OF PATERSON, NEW JERSEY, AND FRANK M. ASHLEY, OF NEW YORK, N. Y.

FILTERING APPARATUS.

SPECIFICATION forming part of Letters Patent No. 741,055, dated October 13, 1903.

Application filed November 24, 1902. Serial No. 132,635. (No model.)

*To all whom it may concern:*

Be it known that I, JOSEPH MILLER, a citizen of the United States, residing in New York city, in the county and State of New York, have invented certain new and useful Improvements in Filtering Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to apparatus for filtering water in large quantities—as, for instance, in connection with waterworks for supplying cities and other large communities, and it has reference particularly to what are known as "gravity-filters."

The principal object of the invention is to so construct an apparatus of this nature that not only in the operation of filtering and the operation of cleaning or washing, which latter operation is usually performed by reversing the action of the filter, but even in the matter of construction sanitary principles will be in every way subserved.

My invention consists, therefore, in an improved filtering apparatus constructed substantially as herein described and shown and as finally embodied in the clauses of the claim.

In the accompanying drawings, wherein corresponding reference-letters indicate like parts, Figure 1 is a top plan view of my improved apparatus. Fig. 2 is a view of said apparatus, partly in side elevation and partly in section, a portion of certain piping being removed. Fig. 3 is a horizontal sectional view of said apparatus, taken on the line $x\,x$, with the sand which forms the filter-bed and which is below the horizontal plane of said line removed; and Fig. 4 illustrates a detail.

In said drawings, $a$ is a tank formed of wood, metal, or other similar material, and $b$ is an annular chamber disposed outside of and at the top portion of said chamber and formed by a correspondingly-shaped wall $c$.

The water to be filtered is led into the tank from a pipe $d$, which is connected with one of a series of radial pipes $e$, centering in a hollow distributing-chamber $f$, which rests on the top edge of said tank $a$. As is usual in this class of filters, communication between the supply-pipe $d$ and the series of radial pipes with which it communicates is controlled by a valve, which is itself controlled by a ball-float mechanism $g$, which is adapted upon the rise of the water supplied to the tank by said series of radial pipes to a certain level to cut off the supply. Each pipe $e$ is provided with a series of downwardly-extending discharges $h$ and two laterally-disposed series of discharges $i$. By disposing the discharges thus the force of the stream flowing from the pipes $e$ is broken and the streams are distributed over a wider area, and so the formation of furrows in the bed $j$ of sand, quartz, or other finely-divided substance, which forms the filtering medium proper and with which the tank $a$ is filled up to approximately its top, is obviated.

$k$ and $l$ are two pipes which are disposed the one above the other and the former of which is provided with parallel branch pipes or tubes $m$, while the latter is provided with parallel branch pipes or tubes $n$, alternating with said first-named branch pipes or tubes. Said pipes or tubes in all cases extend from the main pipe $k$ (or $l$) as far as the circular wall of the tank $a$ will permit, and they are provided with upwardly-extending strainers $o$ and $p$. One of these strainers is shown best in detail in Fig. 4, where $q$ is a substantially conical nozzle having a cap $r$, drilled with perforations $s$, screwed onto its flaring end. It should be remarked that the strainers $p$ stand relatively higher from their pipes $n$ than the strainers $o$ stand from their pipes $m$, so that their tops are all brought into one horizontal plane; also, that just as many strainers as there is room for are fitted to the pipes $m$ and $n$, so that there will be as little unoccupied space as possible between them.

Around the pipes $k$ and $l$ and their branch pipes a bed of cement $s'$ or other similar substance is then filled in up to the plane of the tops of the strainers. On this bed of cement rests the bed $j$, composing the filtering material. It should be remarked that the bottom wall $t$ of the tank has its top surface slightly dished, as at $u$, and that at its deepest portion it is provided with a discharge $v$ for draining off such water as in case the cement should crack and water find its way through it might otherwise remain in the tank to contaminate the water filtered.

The pipes $k$ and $l$ pass through the side wall of the tank $a$ and are respectively connected to the ends $u'$ and $v'$ of piping $w$, which preferably at a point $x$ remote from the filter has communication with one arm of a cross $y$, the other arms of which are connected with a discharge-pipe $z$ for the water filtered, an inlet-pipe 1 for the supply of water to be used in washing or cleaning the filter, and a pipe 2 for connecting the apparatus with the sewer. Communication between the portions $u'$ and $v'$, respectively, of the piping $w$ is controlled by valves 3 and 4, while 5, 6, and 7 are valves in pipes $z$, 1, and 2.

8 9 and 10 11 are valve-controlled tubes leading into the piping $w$ on opposite sides of the point where it communicates with the cross $y$.

12 is a discharge for the chamber $b$, leading to the sewer.

I will first describe the operation of the apparatus with reference to the filtering. The water or other liquid to be filtered being introduced into the chamber $f$ from pipe $d$ is distributed therefrom over the entire surface of the filtering-bed $j$ by the perforated radial pipes $e$. The water then percolates down through the filtering-bed of sand or other material used, finding its way into the pipes $k$ and $l$ through the strainers and the branch pipes into which they lead. Since the discharge from the tank is of course slower than the inflow, the water being filtered gradually fills the tank $a$, overflow being, however, prevented by the ball-float in valve-controlling mechanism $g$. The water discharged from the pipes $k$ and $l$ is prevented from flowing elsewhere than out of the pipe $z$, which leads to the vessel for receiving the filtered water, by the closing of all of the valves except valves 3, 4, and 5. At this time it should be remarked that the function of pipe 2 is to take off the water which is first passed through the filter just after a cleaning thereof has been effected and which may carry more or less pollution thereof with it. When the carrying away of this more or less polluted water has been effected, this valve 2, as well as all the other valves except valves 3, 4, and 5, is closed, as above stated, so that the filtered water is taken to its proper reservoir.

In washing or cleaning the filter the action is, in effect, reversed. This operation may be variously performed. According to one method valves 6 and 3 and 4 (or either of the latter two) are opened. Water thus enters from pipe 1 and passes by way of the pipe $w$ into one or both of the pipes $k$ and $l$ and from thence by way of the branch pipes or tubes and the strainers into the tank, where it forces its way through filter-bed $j$, carrying with it such pollution as may be deposited therein during the filtering. It finally overflows the tank and by way of the chamber $b$ is discharged from the pipe 12, which leads to a sewer. Or instead of supplying only water in the washing operation some suitable gas may be forced through at the same time, the gas being discharged from one of the pipes $k$ (or $l$) and its branch pipes and strainers, while the water is supplied by the other of said pipes and its branch pipes and strainers, or vice versa, according to the manner in which the valves are set, controlling the various communications with piping $w$. I attach considerable importance to the feature of supplying a gas in conjunction with a liquid in the washing operation, because thereby all particles forming the filtering-bed are agitated and otherwise caused to more readily yield up such pollution as may tend to cling to or gather on them. The gas supplied may be air, steam, ozone, &c. The tubes 8 9 and 10 11 are for the introduction of the gas.

It has been proposed to use ozone for a purpose somewhat analogous to that in which in the present case I employ it; but on account of the fact that no appreciable result could be obtained from its use on account of the impracticability of the means heretofore employed for the disintegration to which it must be subjected in order to serve the purpose ozone has never been used, so far as I am aware, for the purpose mentioned to any considerable extent. I have found that by forcing it through a body consisting of comminuted particles, such as the filter-bed of sand or other similar material of a filtering apparatus, this gas can be not only so disintegrated, but so disseminated throughout the tank as to subject every particle of pollution that may collect on each particle of the filtering material to its action.

The filling in of the bottom of the tank $a$ up to the tops of the strainers with cement avoids the production of spaces in which pollution might otherwise collect and be difficult to get at in cleaning the filter. The cleaning can be effected in the present instance with great facility by simply removing the sand and cleaning off the surface formed by the top of the cement and the tops of the strainers.

Having thus fully described my invention, what I claim as new, and desire to secure by Letters Patent, is—

1. The combination of the receptacle in which the filtering is effected, a filter-body in said receptacle, means for introducing into said filter-body the liquid to be filtered, series of parallel pipes disposed under the filter-body in different horizontal planes, and strainers extending upwardly from said pipes and having their tops in substantially a common plane, substantially as described.

2. The combination of the receptacle in which the filtering is effected, a filter-body in said receptacle, means for introducing into said filter-body the liquid to be filtered, series of parallel pipes disposed under the filter-body in different horizontal planes, strainers extending upwardly from said pipes and having their tops in substantially a common plane, and a filling substance occupying the space beneath said strainer-tops and unoccupied by said strainers, substantially as described.

3. The combination of the receptacle in which the filtering is effected, a filter-body disposed in said receptacle, means for introducing into the filter-body the liquid to be filtered, and a plurality of sets of piping arranged in said receptacle beneath the filter-body and in different horizontal planes, and each comprising a series of branch parallel pipes, the branch pipes of the subjacent series being opposed to the spaces between those of the series above them, substantially as described.

4. The combination of the receptacle in which the filtering is effected, a filter-body disposed in said receptacle, means for introducing into the filter-body the liquid to be filtered, a plurality of sets of piping arranged in said receptacle beneath the filter-body and in different horizontal planes, and each comprising a series of branch parallel pipes, the branch pipes of the subjacent series being opposed to the spaces between those of the series above them, and strainers extending upwardly from said branch pipes and having their tops in substantially the same plane, substantially as described.

5. In a filtering apparatus, the combination, with the receptacle in which the filtering is effected, of a filter-body disposed in said receptacle, means for supplying the liquid to be filtered to the receptacle, a plurality of sets of piping disposed in said receptacle beneath the filter-body, a common water-supply pipe communicating with said sets of piping, and valved fluid-supply pipes communicating with each of said sets of piping between said receptacle and the point of connection of said common water-supply pipe and said sets of piping, substantially as described.

In testimony that I claim the foregoing I have hereunto set my hand this 22d day of November, 1902.

JOSEPH MILLER.

Witnesses:
JOHN W. STEWARD,
DAVID H. BILDER.